United States Patent [19]

Suzuki

[11] Patent Number: 5,444,582
[45] Date of Patent: Aug. 22, 1995

[54] DISK DRIVE SERVO CONTROL WITH PULSE WIDTH AND AMPLITUDE CONTROL FOR A POSITION SERVO SIGNAL

[75] Inventor: Yasuaki Suzuki, Kanagawa, Japan

[73] Assignee: Sony Corporation, Tokyo, Japan

[21] Appl. No.: 647,764

[22] Filed: Jan. 30, 1991

[30] Foreign Application Priority Data

Jan. 31, 1990 [JP] Japan .................................. 2-20957

[51] Int. Cl.[6] .................. G11B 5/596; G05B 11/28
[52] U.S. Cl. ..................... 360/78.09; 360/77.08; 318/599
[58] Field of Search ............ 360/77.08, 78.04, 78.11, 360/78.09; 318/599

[56] References Cited

U.S. PATENT DOCUMENTS

| 3,881,184 | 4/1975 | Koepcke et al. | 360/78.11 |
|---|---|---|---|
| 4,217,612 | 8/1980 | Matla et al. | 360/78.04 |
| 4,381,526 | 4/1983 | McLaughlin et al. | 360/78 |
| 4,590,527 | 5/1986 | Warner | 360/78.11 |
| 4,974,109 | 11/1990 | Hoshimi et al. | 360/78.11 |
| 5,105,318 | 4/1992 | Tsuneta et al. | 360/78.04 |
| 5,136,439 | 8/1992 | Weispfenning et al. | 360/77.08 |

FOREIGN PATENT DOCUMENTS

| 0005966B1 | 12/1979 | European Pat. Off. | G11B 5/58 |
|---|---|---|---|
| 0147993A2 | 7/1985 | European Pat. Off. | G11B 5/55 |
| 3723280A1 | 1/1988 | Germany | G11B 21/10 |
| 4000663C1 | 6/1991 | Germany | G11B 5/55 |

*Primary Examiner*—Timothy P. Callahan
*Assistant Examiner*—Trong Phan
*Attorney, Agent, or Firm*—Limbach & Limbach; Philip M. Shaw, Jr.

[57] ABSTRACT

A disk drive servo control circuit for controlling a position of a head using servo information obtained from a disk at predetermined time intervals, the servo information being converted to a digital servo control signal which is supplied to a digital to analog (D/A) converter whose output drives a head actuator for moving the head with respect to a selected track, wherein the width of the output signal of the D/A converter is controlled to have a time interval which is shorter than the predetermined time intervals at which the servo information is reproduced, to thereby reduce the minimum resolution in the track following mode without changing the maximum current to the actuator during track seeking.

4 Claims, 4 Drawing Sheets

DISK DRIVE SERVO CONTROL WITH PULSE WIDTH AND AMPLITUDE CONTROL FOR A POSITION SERVO SIGNAL

BACKGROUND OF THE INVENTION

1. Field of the Invention

The present invention relates to a disk driving apparatus and, more particularly, to a disk driving apparatus suitable for a magnetic disk.

2. Description of the Prior Art

In a disk driving apparatus of the sector servo type, a current to drive an arm which is connected to a voice coil motor is generally obtained through a V/I (voltage/current converting) amplifier after servo information of a digital signal was converted into an analog voltage by a D/A converter. The dynamic range of the servo information, that is, the maximum output current is determined from the maximum needed acceleration of the arm upon seeking and is obtained from the specification of a required seeking time. In addition, it is required that the minimum output current corresponding to one least significant bit (LSB) output of the D/A converter is equal to or less than the minimum resolution of the movement at the time of the track following servo and than the amplitude of disturbance.

As the track density increases, the minimum output current corresponding to one LSB output of the D/A converter must be further reduced. However, there is a limitation in the number of bits of the D/A converter which is used. There is a problem such that, on the contrary, if one LSB output is determined by giving importance to the track tracing performance, the maximum output current upon seeking decreases and the seeking time increases.

To solve the above problems, there is also considered a method whereby the gain of the V/I amplifier is switched in the seeking mode and the track following mode. However, in this case, there are problems such that the number of circuits increases, it is necessary to adjust an analog section, and the like.

OBJECTS AND SUMMARY OF THE INVENTION

It is, therefore, an object of the invention to provide a disk driving apparatus which can further reduce the minimum resolution in the track following mode without changing the maximum output current upon seeking.

According to an aspect of the present invention, there is provided a servo control for a disk driving apparatus for controlling a position of a head using servo information obtained intermittently from a disk, comprising means for reproducing, at predetermined time intervals, servo information from the disk, means supplied with the servo information for generating a digital servo control signal, a digital to analog (D/A) converter, actuating means supplied with an output of the D/A converter for moving the head with respect to a selected track in response to the output of the D/A converter, and means for controlling a width of an output signal of the D/A converter to have a time interval which is shorter than the predetermined time intervals at which the servo information is reproduced.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

An embodiment of the invention will be described hereinbelow with reference to FIGS. 1 to 6.

Figure 1:
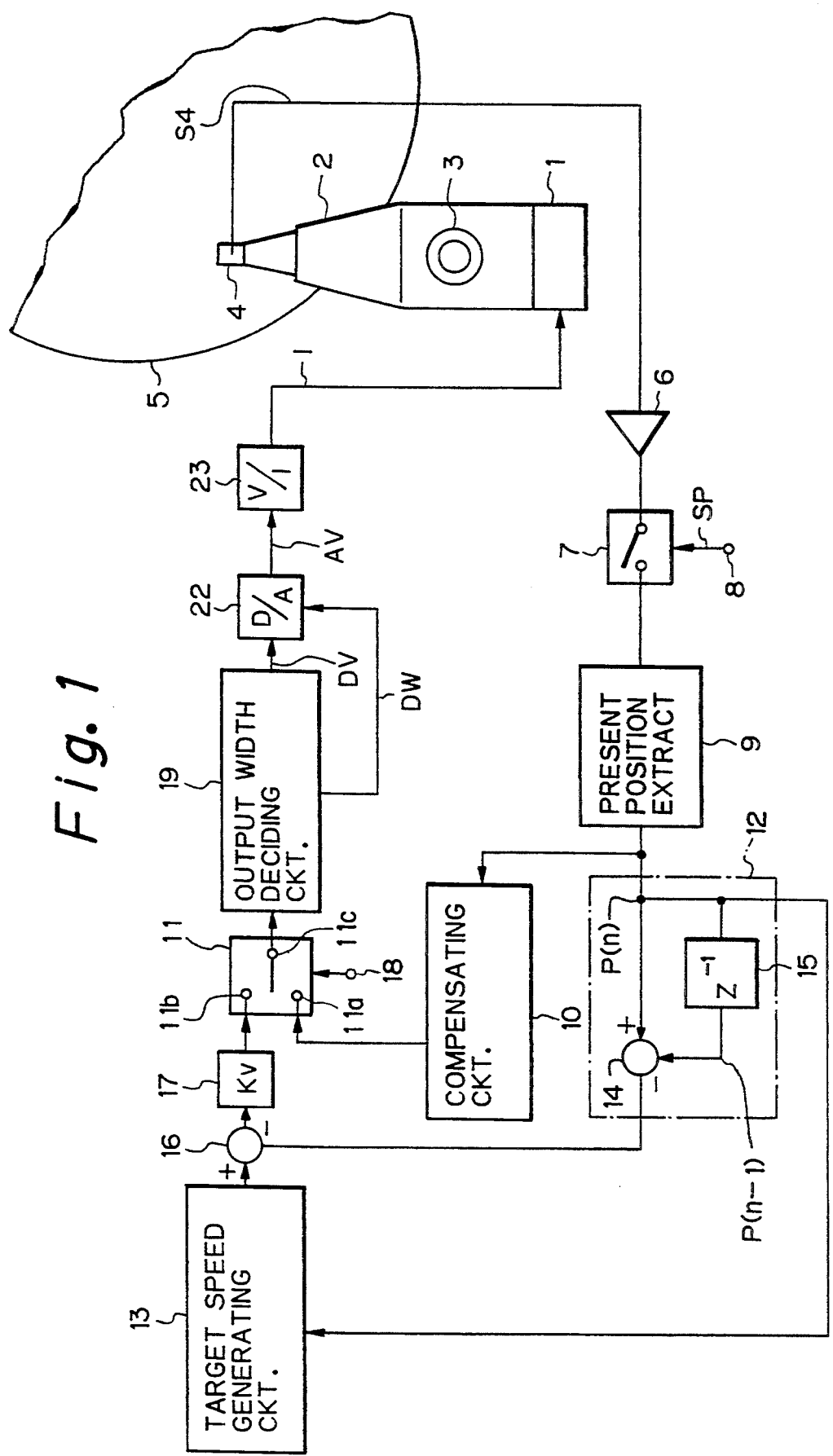
FIG. 1 is a block diagram showing an embodiment of the invention.

FIG. 1 shows a construction of a control system of a magnetic head position of a disk driving apparatus to which the invention is applied. In the control system of the magnetic head position, the position of magnetic head at a tip of the arm is controlled by switching between a seeking mode, to move the magnetic head to a target track, and a track following mode in which the magnetic head moves to the center position of the target track.

In the construction of FIG. 1, an arm 2 rotates around a shaft 3 as a center by an actuator such as a voice coil motor 1. A magnetic head 4 attached to the tip portion of the arm 2 moves in the radial direction (direction indicated by an arrow R in FIG. 2) of a magnetic disk 5.

Figure 2:
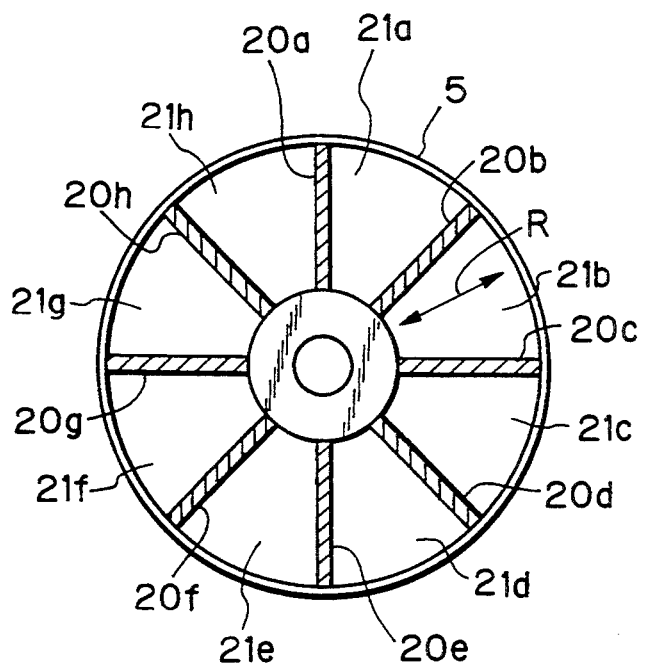
FIG. 2 is a plan view showing a magnetic disk.

The control system of the magnetic head position uses the sector servo type. Servo regions 20a to 20h extending radially at regular angular intervals are provided on the magnetic disk 5 as shown in FIG. 2. An intratrack address signal indicative of the position of the magnetic head 4 in a track and an address signal indicative of the position of the track have previously been recorded in each of the sector-shaped servo areas 20a to 20h. A number of data tracks are concentrically formed in data areas 21a to 21h other than the servo areas 20a to 20h.

A reproduction signal S4 which is reproduced by the magnetic head 4 is supplied to a sampling circuit 7 through an amplifier 6. A sampling pulse SP is supplied from a timing controller (not shown) to the sampling circuit 7 through a terminal 8. The reproduction signal S4 of the magnetic head 4 is sampled and held by the sampling pulse SP. The reproduction signal S4 is supplied to a present position extracting circuit 9.

The present position extracting circuit 9 detects the position of a present track using the address signal in the reproduced servo information and also detects the position in the track using fine information which is formed from the intratrack address signal. Position data P(n) indicative of the present position of the magnetic head 4 formed by the present position extracting circuit 9 is supplied to a terminal 11a of a switching circuit 11 through a compensating circuit 10 and is also supplied to a speed detecting circuit 12 and a target speed generating circuit 13.

A control amount which was formed by an integrating operation, a differentiating operation, a proportional operation, and the like for a position error from the track center is supplied to the terminal 11a of the switching circuit 11 from compensating circuit 10.

The speed detecting circuit 12 detects the present speed of the magnetic head 4 and is constructed by a subtracting circuit 14 and a delay circuit 15. In the subtracting circuit 14, the present speed is detected on the basis of the present position data P(n) and position data P(n−1) of one sample timing before from the delay circuit 15. Although the speed is generally obtained by a moving distance and a time for the movement, since a time interval for sampling is set to a constant value, the present speed of the magnetic head 4 can be detected from the present position data P(n) and the position data P(n−1) of one sample timing before. The present speed obtained by the subtracting circuit 14 is supplied to subtracting circuit 16.

The target speed generating circuit 13 generates a speed profile as a target speed of the magnetic head 4 in accordance with the present position of the magnetic head 4 which is supplied from the present position extracting circuit 9 and the distance between the present position and the target track. In the speed profile, when the above distance is large, the magnetic head 4 is moved at the maximum speed and, on the contrary, when the distance is small, the speed of the magnetic head 4 is decelerated. The target speed formed by the target speed generating circuit 13 and the present speed formed by the speed detecting circuit 12 are supplied to the subtracter 16. The subtracter 16 executes a subtraction between the target speed and the present speed. The difference component is supplied to a terminal 11b of the switching circuit 11 through an amplifier 17 having a gain of Kv.

The switching circuit 11 switches the connection in accordance with a mode signal which is supplied from a terminal 18. More specifically, terminals 11b and 11c are connected in the seeking mode and terminals 11a and 11c are connected in the track following mode. Therefore, a speed control such as to trace the speed profile is executed in the seeking mode and a position control for the track center is performed in the track following mode. An output signal from the switching circuit 11 is supplied to an output width deciding circuit 19. The output signal from the switching circuit 11 is a digital code having x bits (e.g. 2' complementary code).

In the output width deciding circuit 19, a bit shift, which will be explained hereinlater, is executed. A digital code (n bits) DV corresponding to the level of the output voltage and control signal DW for controlling an output time interval WT are generated in the output width deciding circuit 19. The digital code DV and the control signal DW are supplied to a D/A converter 22. The D/A converter 22 is an n-bit converter. The data DV and the control signal DW are renewed in any of the seeking mode and the track following mode.

The output time interval WT of the D/A converter 22 is controlled by the signal DW. That is, for a period of time when the signal DW is, for example, at the high level ("1"), the digital code DV is, converted into an analog output voltage AV and is supplied to a voltage/current converting circuit 23. The voltage/current converting circuit 23 converts the output voltage AV into an output current I and supplies the current I to the voice coil motor 1. The voice coil motor 1 rotates the arm 2 in proportion to the value of the current I, thereby moving the magnetic head 4 to a desired track center.

Figure 3:
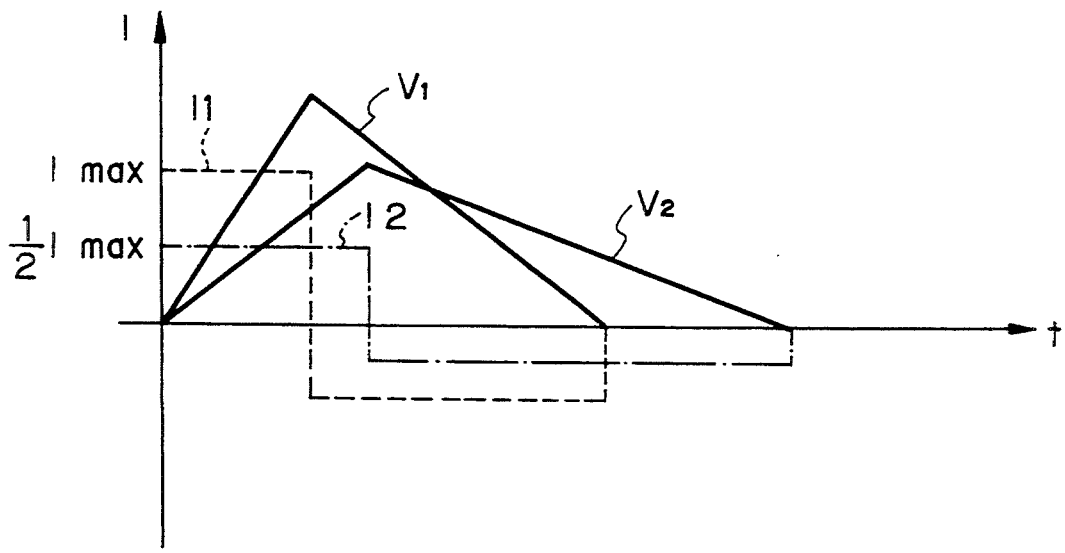
FIG. 3 is a diagram showing the relation between the current and the speed in the seeking mode.

FIG. 3 shows the relation between a velocity v and the output current I in the seeking mode. The velocity v is the speed of the magnetic head 4 attached to the tip of the arm 2. The output current I is the current which is supplied to the voice coil motor 1. On the other hand, in FIG. 3, the relation shown by I1 and v1 denotes a state in which the magnetic head is accelerated by the maximum output current Imax and is decelerated so as to trace the speed profile. The relation shown by I2 and v2 shows a state in the case where the output current I is set to ($\frac{1}{2}$)·(Imax) and the magnetic head is moved by the same distance. t denotes a time.

In FIG. 3, as will be understood from the relation of I1 - v1, the magnetic head is accelerated by the maximum output current Imax during the acceleration and is moved so as to trace the speed profile during the deceleration. Therefore, when the number of bits of the D/A converter 22 is set to the n-bit, the maximum output current Imax flows in correspondence to the output ($\pm 2^{n-1}$). Thus, for one LSB of the D/A converter 22, the current I of $Imax/2^{n-1}$ flows in correspondence thereto.

To accomplish a high track density such that a track pitch is equal to or less than 20 μm, in the track following mode, it is necessary to increase the tracing accuracy so that the minimum resolution is equal to or less than 1 μm. However, the number of bits of the D/A converter 22 is ordinarily small such as 8 bits, 12 bits or 16 bits, so that a limitation occurs in the tracing accuracy. On the contrary, when the maximum output current Imax is reduced, although the tracing accuracy is assured, the acceleration upon seeking decreases and the seeking time increases.

Figure 4:
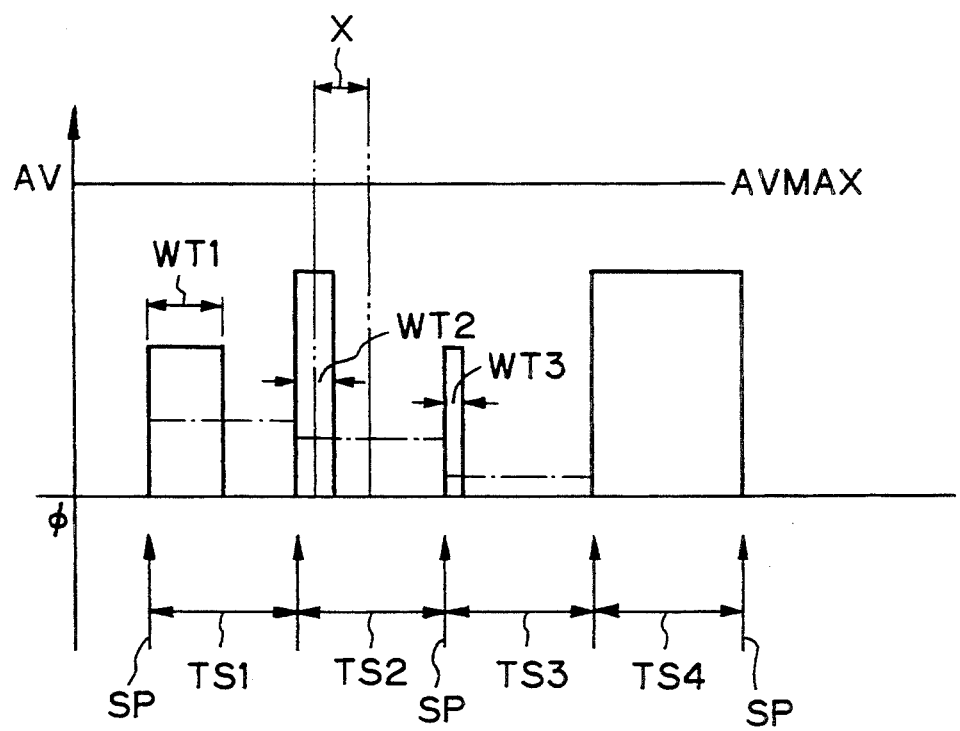
FIG. 4 is a diagram showing a time-dependent output width of the output voltage and its level.

Therefore, the control such as to reduce the minimum resolution in the track following mode without changing the maximum output current Imax is shown in FIG. 4. In the diagram, the timing at which the sampling pulse SP is supplied is shown by an arrow. Sampling intervals are set to TS1 to TS4. All of the intervals TS1 to TS4 are equal.

As shown by an alternate long and short dash line in FIG. 4, the conventional control is such that a predetermined output current is continuously supplied for the intervals TS1 to TS4. On the other hand, according to the control of the invention, the time-dependent output width WT in which the analog output voltage AV is output from the D/A converter 22 is reduced into ($\frac{1}{2}^m$) of the sampling interval TS and the level of the output voltage AV is increased by $2^m$ times. Here, m is a shift amount of the bit shift. For instance, an example of m=1 is shown for the period TS1. The output width WT1 of the analog output voltage AV is set to ($\frac{1}{2}$) of the conventional one, while the level of the output voltage AV is set to be twice as large as the conventional one.

For the period TS2, an example of m=2 is shown. The output width WT2 of the output voltage AV is set to ($\frac{1}{4}$) of the conventional one, while the level of the output voltage AV is set to be four times as large as the conventional one.

For the period TS3, an example of m=3 is shown. The output width WT3 of the output voltage AV is set to ($\frac{1}{8}$) of the conventional one, while the level of the output voltage AV is set to be eight times as large as the conventional one.

In the case where a current larger than the current corresponding to ($\frac{1}{8}$) of the maximum output current Imax is needed, as shown in the interval TS4, an output voltage of a predetermined level is supplied for the whole interval TS4 in a manner similar to the conventional apparatus. In the diagram, AVMAX denotes the maximum output of the D/A converter 22.

As will be understood from FIG. 4 and the above description, hitherto, the integration value of the current for the sampling interval TS is set to (TS·I). On the other hand, the integration value of the current for the sampling interval TS in the embodiment is set to $$(TS/2^m) \cdot 2^m I = (TS \cdot I)$$

Both of the integration values are equal. The moving speed of the arm 2 is proportional to the integration value. Thus, the minimum resolution in the track following mode can be improved without changing the maximum output current Imax. As compared with the conventional technique, the minimum unit for quantization can be raised to ($\frac{1}{2}^m$) and the track tracing accuracy can be improved.

In the conventional technique, the output voltage AV of the D/A converter 22 is generated for the whole sampling interval TS. As an output timing of the output voltage AV, a phase delay similar to the delay of only (TS/2) occurs. However, in the embodiment of the invention the delay of the output timing of the output voltage AV is equal to $(TS/2^{m+1})$. The phase delay can be reduced as shown by an arrow X in FIG. 4.

Figure 6:
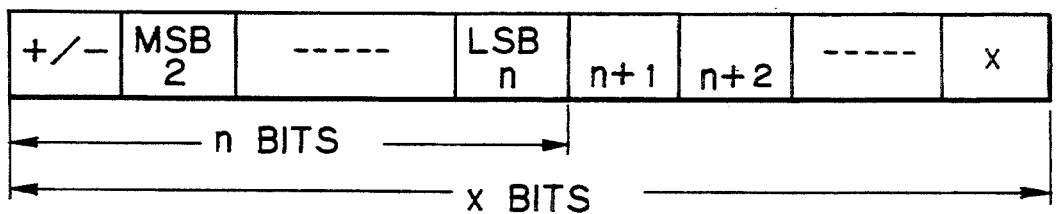
FIG. 6 is an explanatory diagram showing a construction of data.
Figure 5:
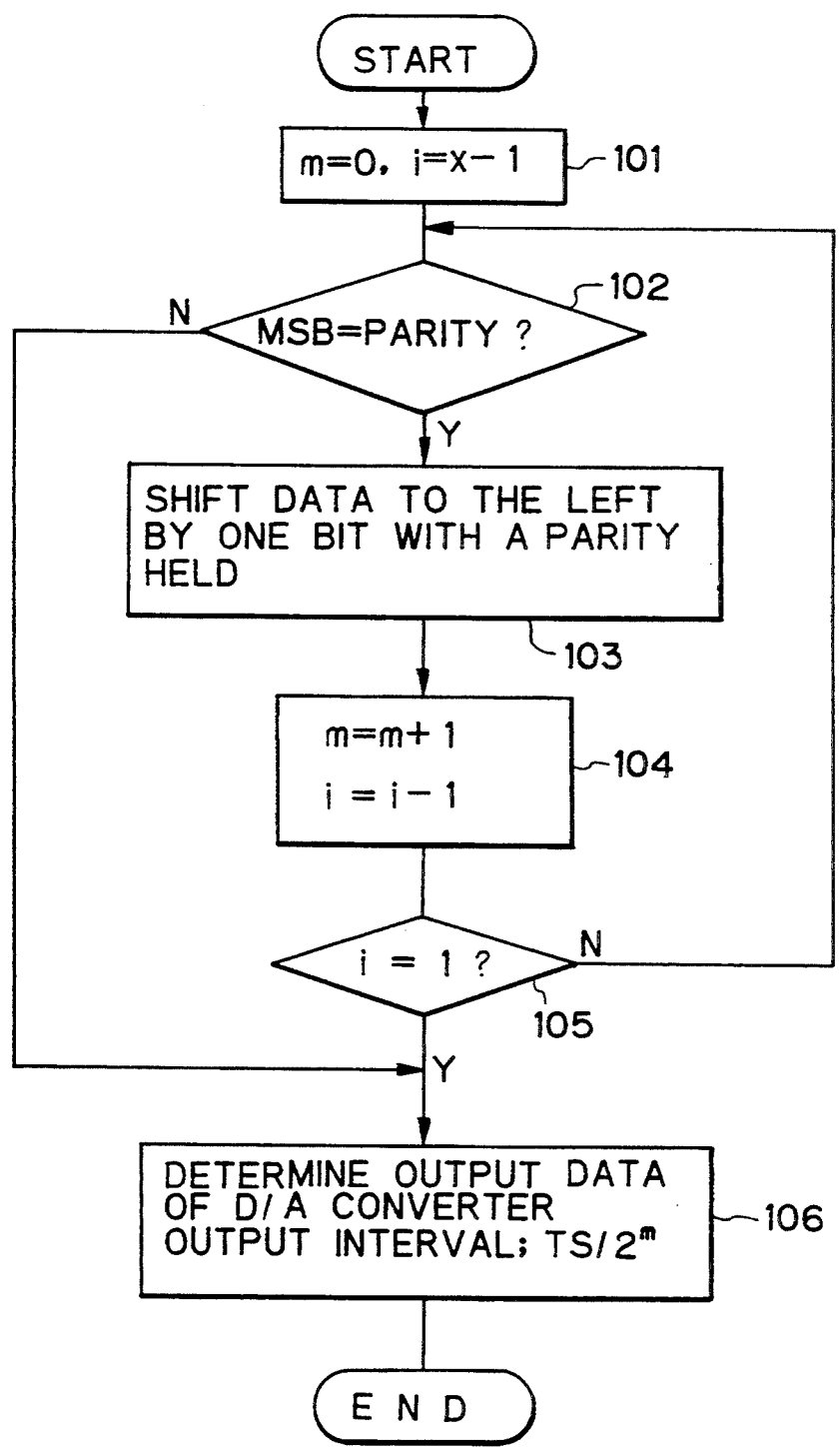
FIG. 5 is a flowchart showing the operation of an output width deciding circuit.

The operation of the output width deciding circuit 19 is shown in a flowchart of FIG. 5. The operation of the output width deciding circuit 19 relates to the operation in the track following mode. FIG. 6 shows a construction of output data from the circuit 19.

In FIG. 6, the bits from the first bit on the most significant bit (MSB) side to the xth bit on the LSB side for instance, sixteen bits are used as data bits. The first bit is a parity bit which indicates a polarity. The second bit on the MSB side is MSB of the data. The bits from the first bit to the nth bit are set to an input bit length n of the D/A converter 22.

In FIG. 5, in step 101, when a shift amount is set to m and a bit length of the data is set to x, it is initialized such that m=0 and i=x−1. In step 102, a check is made to see if the MSB is equal to a parity bit or not. If this condition is satisfied, the next step 103 follows. If the above condition is not satisfied, step 106 follows.

In step 103, the data is shifted to the left (to MSB side) by one bit with the parity bit held. After that, step 104 follows. In step 104, the calculations shown by the following equations are executed.

$$m = m + 1$$

$$i = i - 1$$

In step 105, a check is made to see if i is equal to 1 or not. If i is not equal to 1 yet, the processing routine is returned to step 102. If i is equal to 1, step 106 follows. In step 106, the output interval WT of the output voltage AV of the D/A converter 22 is set to $(TS/2^m)$.

The operation shown in FIG. 5 is explained using an example (n=4, x=8). Assuming that a code signal which is supplied to the circuit 19 is (0 (parity indicative +) 0001000). According to the flowchart of FIG. 5, the code signal is shifted to the left as follows.

| parity | MSB | m | i |
| --- | --- | --- | --- |
| 0 | 0 | 001000 | 0 | 7 |

-continued

| parity | MSB | m | i |
| --- | --- | --- | --- |
| 0 | 0 | 010000 | 1 | 6 |
| 0 | 0 | 100000 | 2 | 5 |
| 0 | 1 | 000000 | 3 | 4 |

When m reaches at 4, the parity is not equal to MSB. Then the output width WT is set to $(TS/2^3)$. In addition, a digital code (0100) is supplied to the D/A converter 22 as an input data DV. Therefore the output voltage AV derived from the D/A converter 22 is $(AV' \cdot 2^3)$ (here AV' means original value of the code signal having x bits).

In the embodiment, although not particularly described in detail, the position control of the magnetic head 4 can be also executed by a software servo. However, in this case, a processor is necessary. In the processes shown in the above flowchart, x bits, for instance, sixteen bits are needed as an input data length. To form such a 16-bit data, there is no need to use a 16-bit CPU but it is also possible to process the upper eight bits and the lower eight bits in sixteen bits in a time-sharing manner by using an 8-bit CPU. On the other hand, in the embodiment, although the voice coil motor 1 has been described as an example of an actuator, the invention is not limited to such a motor but a linear motor can be also used.

According to the invention, there is an effect such that the minimum resolution in the track following servo can be reduced to a value which is equal to or less than the minimum resolution of the movement and the amplitude of the disturbance in the track following mode. According to the invention, there is an effect such that the phase delay can be reduced.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A servo control for a disk driving apparatus for controlling a position of a head using servo information obtained intermittently from a disk, comprising:
    means for reproducing, at predetermined time intervals TS, servo information from the disk;
    means supplied with the servo information for generating a digital servo control signal;
    a digital to analog (D/A) converter;
    actuating means supplied with an output of the D/A converter for moving the head with respect to a selected track in response to the output of the D/A converter; and
    output width deciding means supplied with the digital servo control signal for performing a bit shift, outputting to the D/A converter a digital code corresponding to a level of the digital servo control signal and a signal for controlling a width of an analog output signal of the D/A converter to have a time interval which is shorter, as a function of the bit shift, than the predetermined time intervals TS at which the servo information is reproduced.

2. A servo control for a disk driving apparatus according to claim 1, wherein the digital servo control signal has a total of x bits, where x is an integer, with a first bit being a parity bit and a second bit being a most significant bit (MSB); and the output width deciding means receives the digital servo control signal, repeatedly shifts the bits of the digital servo control signal toward the parity bit, but without shifting the parity bit, until the MSB does not equal the parity bit, at which time the total number of bit shifts is an integer m, and controls the D/A converter to have a time interval equal to $TS/2^m$.

3. A servo control for a disk driving apparatus according to claim 1, further comprising converting means for converting a voltage output signal of the D/A converter to a driving current for the actuating means.

4. A servo control for a disk driving apparatus according to claim 1 or 3, wherein changes made in an amplitude of the output signal of the D/A converter by the output width deciding means are in inverse proportion to changes made in the width of the output signal of the D/A converter.

* * * * *